United States Patent Office 3,112,294
Patented Nov. 26, 1963

3,112,294
POLYEPOXIDES FROM EPOXY-SUBSTITUTED MONOCARBOXYLIC ACIDS, THEIR PREPARATION AND POLYMERS
Herbert A. Newey, Lafayette, Calif., assignor to Shell Oil Company, New York, N.Y., a corporation of Delaware
No Drawing. Filed Apr. 30, 1956, Ser. No. 581,291
9 Claims. (Cl. 260—78.3)

This invention relates to a new class of polyepoxides and to a method for their preparation. More particularly, the invention relates to new polyepoxides derived from epoxy-substituted carbocyclic monocarboxylic acids, to a method for their preparation and to the utilization of the new polyepoxides, particularly in the preparation of pottings and castings and in the preparation of improved coating compositions.

Specifically, the invention provides new and particularly useful polyepoxides comprising esters of vic-epoxy-substituted carbocyclic monocarboxylic acids, and polyhydric alcohols, such as, for example, ethylene glycol di(2,3-epoxycyclohexanecarboxylate). The new polyepoxides are preferably prepared by reacting the polyhydric alcohol with an ethylenically unsaturated carbocyclic monocarboxylic acid to form the polyester, and then treating the resulting ester with a peroxidizing agent to convert the ethylenic group in the acid portion of the molecule to an epoxy group.

The invention further provides cured products obtained by reacting the above-described new polyepoxides with epoxy curing agents, such as amines, polybasic anhydrides, $BF_3$ and its complexes, metal salt catalysts and the like.

It is an object of the invention to provide a new class of polyepoxides and a method for their preparation. It is a further object to provide new polyepoxides from ethylenically unsaturated carboxylic monocarboxylic acids. It is a further object to provide new polyepoxides which possess low viscosities. It is a further object to provide new polyepoxides which have a high degree of reactivity with epoxy curing agents, such as acid anhydrides, amines and $BF_3$ complexes. It is a further object to provide new non-aromatic polyepoxides which can be cured to form hard solvent resistant castings and coatings. It is a further object to provide new polyester polyepoxides which are useful as combined plasticizer-stabilizers. Other objects and advantages of the invention will be apparent from the following detailed description thereof.

It has now been discovered that these and other objects may be accomplished by the new polyepoxides of the present invention which comprise esters of vic-epoxy-substituted carbocyclic monocarboxylic acids and polyhydric alcohols. These new polyepoxides have been found to possess many new and unexpected properties due to their special structural features. It has been found, for example, that these new polyepoxides possess low viscosities and can be used as such in the preparation of cured products without the addition of diluents. In fact, some of the new polyepoxides have such low viscosities that they may be used as diluents themselves for other types of polyepoxides, such as the commercially available glycidyl ethers of polyhydric phenols. It has also been found that these new polyepoxides have high activity toward epoxy curing agents, such as amines, anhydrides, $BF_3$ and $BF_3$ complexes, and can be cured therewith to form very hard resistant products. This was quite unexpected as previously prepared polyepoxides having the epoxy group in an internal position, such as, for example, epoxidized triglycerides, have been very slow to react with epoxy curing agents, such as amines.

The novel polyepoxides of the present invention comprise the esters of vic-epoxy-substituted carbocyclic monocarboxylic acids and polyhydric alcohols. The expression "vic-epoxy" as used herein refers to the group

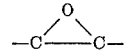

i.e., wherein the oxygen atom is attached to vicinal carbon atoms. The expression "carbocyclic" refers to acids having the carboxyl group attached to a carbocyclic ring, such as a cyclohexane, cyclopentane or benzene or naphthalene ring. The carbon atoms of the vic-epoxy group may form a part of the ring, such as in the case of 2,3-epoxycyclohexanecarboxylic acid, or the vic-epoxy group may be contained in a side chain attached to the ring, such as in the case of epoxypropylbenzoic acid. Examples of these acids include, among others, 2,3-epoxycyclohexanecarboxylic acid, 3,4-epoxycyclohexanecarboxylic acid, 3,4-epoxycyclopentanecarboxylic acid, 3-isopropyl-3,4-epoxycyclohexanecarboxylic acid, 3-(2,3-epoxypropyl) cyclohexanecarboxylic acid, 3-(2,3-epoxypropoxy)-cyclohexanecarboxylic acid, p-(2,3-epoxy-3-methylpropyl)benzoic acid, 3,5-di(2,3-epoxy-3-methylpropyl)benzoic acid, and the like. Particularly preferred acids comprise the epoxycycloalkanecarboxylic acids containing from 6 to 12 carbon atoms, the epoxyalkyl and epoxyalkoxy-substituted cycloalkanecarboxylic acids containing from 8 to 15 carbon atoms and the epoxyalkyl and epoxyalkoxy-substituted aromatic monocarboxylic acids containing from 9 to 18 carbon atoms.

The polyhydric alcohols used in producing the novel esters of the invention are alcohols containing a plurality, e.g., two, three, four or more, esterifiable hydroxyl groups. The alcohols may be monomeric or polymeric, acyclic, or heteroclyclic and may be further substituted with non-interfering substituents, such as halogen atoms, alkoxy radicals, ester radicals and the like. Examples of the polyhydric alcohols are ethylene glycol, propylene glycol, glycerol, pentaerythritol, polypentaerythritol, polyglycerol, mannitol, sorbitol, dulcitol, inositol, carbohydrates, methyltrimethylolpropane, butanediol, 1,2,6-hexanetriol, 2,8-dodecanediol, glycerol monoethyl ether, glycerol allyl ether, diethylene glycol, 2-ethyl-hexanetriol-1,2,6, tetrahydroxycyclohexane, 3,3'-thiodipropanol, 4,4'-thiodibutanol, poly(allyl alcohol), poly(vinyl alcohol), poly(methallyl alcohol), polyols formed by condensation of bis-phenols and epichlorohydrin, and the like, and mixtures thereof.

Preferred polyhydric alcohols are the aliphatic saturated polyhydric alcohols containing from 2 to 6 hydroxyl groups and from 2 to 16 carbon atoms, such as, for example, ethylene glycol, diethylene glycol, glycerol, pentaerythritol, mannitol, polyglycerol, low molecular weight poly(allyl alcohol), poly(vinyl alcohol), and the like. Especially preferred alcohols are alkane polyols containing from 2 to 4 hydroxyl groups and from 3 to 12 carbon atoms.

Examples of these new epoxides include, among others, ethylene glycol bis(2,3-epoxycyclohexanecarboxylate), glycerol tri(2,3-epoxycyclohexanecarboxylate), diethylene glycol bis(3,4-epoxycyclohexanecarboxylate), 1,5-pentanediol bis(3,4-epoxycyclohexanecarboxylate), ethylene glycol bis(2,3-epoxycyclopentanecarboxylate), 1,8-octanediol bis(3,4-epoxycyclohexanecarboxylate), 3,3'-sulfonyldipropanol bis(2,3-epoxycyclohexanecarboxylate), 1,2,6-hexanetriol tri(2,3-epoxycyclohexanecarboxylate), pentaerythritol tetra(2,3-epoxycyclohexanecarboxylate), glycerol monoacetate di(2,3-epoxycyclohexanecarboxylate), glycerol monocaproate di(2,3-epoxycyclohexanecarboxylate), glycerol monostearate di(2,3-epoxycyclohexanecarboxylate), diethylene glycol bis(4-(2,3-epoxypropyl)benzoate), 4,4'-sulfonyldibutanol bis(4-(2,3-epoxypropyl)-benzoate), diethylene glycol bis(4-(2,3-epoxypropyl)benzoate), ethylene glycol bis(4-(2,3-epoxy-2-methylpropyl) benzoate), polyallyl alcohol 2,3-epoxycyclohexanecarboxylate, polyvinyl alcohol 2,3-epoxycyclohexanecarboxylate, ethylene glycol bis(2,3-epoxy-4-tert-butylcyclohexanecarboxylate), triethylene glycol bis(2,3-epoxy-4-chlorocyclohexanecarboxylate) and 1,6-hexanediol bis(2,3-epoxy-4-methoxycyclohexanecarboxylate).

Especially preferred polyepoxides of the invention are the esters of alkane polyols having from 2 to 4 hydroxyl groups and the epoxy-substituted cycloalkanecarboxylic acids, such as, for example, glycerol tri(2,3-epoxycyclohexanecarboxylate), 1,5-pentanediol bis(2,3-epoxycyclohexanecarboxylate), 1,2,-pentanetriol tri(3,4-epoxycyclohexanecarboxylate) and 1,8-octanediol bis(3,4-epoxycyclohexanecarboxylate).

Coming under special consideration, particularly because of their ease of preparation and their unexpectedly superior reactivity toward curing agents are the esters prepared from monocarboxylic acids having the epoxy group contained in a side chain and in a terminal position, such as, epoxidized methallylbenzoic acid. Examples of these special esters include, among others, ethylene glycol bis(4-(2,3-epoxy-2-methylpropyl)benzoate), glycerol tri(4-(2,3-epoxy-2-ethylpropyl)benzoate), 1,5-pentanediol bis(2,3-epoxy-2-ethylpropyl) benzoate and diethylene glycol bis-(3,5-di(2,3-epoxy-2-methylpropyl) benzoate).

The esters of the invention may be prepared by any suitable method. They are preferably prepared by reacting the polyhydric alcohol with the carbocyclic monocarboxylic acid containing an ethylenic group to form the polyester and then treating this ester with a peroxidizing agent to convert the ethylenic groups to epoxy groups.

The esters of the polyhydric alcohols and the carbocyclic monocarboxylic acids possessing the ethylenic group may be prepared by conventional esterification methods wherein the acid and alcohol are combined in chemical equivalent amounts, preferably in the presence of an esterification catalyst. Catalysts that may be used in the esterification include, among others, p-toluenesulfonic acid, chloroacetic acid, sulfuric acid, benzenesulfonic acid, formic acid, boron and silicon fluorides, acid salts, such as mic acid, boron and silicon fluorides, acid salts, such as mono-sodium and mono-potassium sulfates and salts of strong acids and weak bases, such as aluminum sulfate, zinc chloride, zinc sulfate, and the like. The amount of the catalyst employed will vary over a wide range depending upon the particular reactants and catalyst selected but in most cases will generally vary between 0.1% to 5% by weight of the reactants.

The amount of the acid and alcohol to be used in the esterification will vary over a wide range. In general, one mole of acid should be employed for every hydroxyl group to be esterified with that particular acid. In many cases, it is desired to employ the acid in excess of the calculated amount.

The esterification may be accomplished in the presence or absence of solvents or diluents. In case solvents or diluents are desired, inert organic compounds, such as benzene, toluene, cyclohexanone and xylene, and mixtures thereof, are generally more preferred.

The temperature employed during the esterification may vary over a wide range, depending upon the particular reactants and catalysts employed. In most cases, the temperature will range from about 100° C. to about 300° C. with a more preferred range being between 200° C. and 250° C.

To minimize undesired side reactions and to prevent excessive discoloration, it is sometimes desirable to conduct the esterification in the absence of oxygen-containing gases, preferably providing a blanket of an inert gas, such as nitrogen or carbon dioxide.

The epoxidation of the unsaturated esters may be advantageously carried out by reacting the esters with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as described above, for every ethylenic group to be epoxidized. Thus, to produce ethylene glycol bis(epoxycyclohexanecarboxylate) from ethylene glycol bis(cyclohexenecarboxylate) one should react one mole of the unsaturated ester with approximately two moles of the epoxidizing agent. In some cases, it is rather difficult to effect epoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like may be used. It is not necessary to operate under anhydrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and oxidizing agent selected. It is generally desirable to maintain the temperature between −20° C. to 60° C. and more preferably between 10° C. and 40° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The polyepoxides of the present invention are water-white to slightly yellow colored liquids. They have at least two epoxy groups per molecule and are substantially free of chlorine. As noted above, they have low viscosities and are generally soluble in most solvents, such as ketones, alcohols and liquid hydrocarbons, and are compatible with many synthetic oils and resins.

For certain applications, such as in the preparation of polymeric products, it is sometimes desirable to have high molecular weight products. Such products may be obtained by reacting the above-described new polyepoxides with polyhydric compounds. In this case, the polyhydric compound reacts with the vic-epoxy groups to form

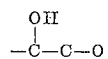

groups. High molecular weight products may be obtained from ethylene glycol bis(epoxycyclohexanecarboxylate), for example, by reacting X moles of that compound with one mole of a polyhydric phenol having X OH groups. Such products have the formula

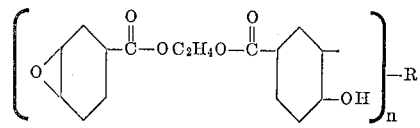

wherein R is the residue of the polyhydric phenol and $n$ is an integer representing the number of OH groups on the polyhydric phenol molecule. Polyhydric compounds used for this purpose may be any polyhydric phenol, such as resorcinol, 2,2-bis(4-hydroxyphenyl)propane, catechol, hydroquinone, methyl resorcinol, 2,2-bis(4-hydroxyphenyl)butane and the like.

The condensation reaction described above for the preparation of the higher molecular weight products may be accomplished by merely heating the components together in the presence or absence of inert diluents. The condensation reaction is preferably accomplished at temperatures ranging from about 25° C. to 200° C. and more preferably from 150° C. to about 200° C.

If the resulting high molecular weight products possess less than the desired number of epoxy groups, such as may be the case when the polyhydric phenol is reacted with less than a double molar quantity of the new polyepoxides, additional epoxy groups may be introduced by reacting the higher molecular weight products with additional quantities of the epoxy-forming material, e.g., the epoxy-halo-alkanes, such that there will be one epoxy group for each of the OH groups of the polyhydric phenol to be reacted. Thus, if the higher molecular weight product was obtained by reacting one mole of ethylene glycol bis(epoxycyclohexanecarboxylate) with two moles of the dihydric phenol, the resulting higher molecular weight product would then be reacted with approximately two moles of the epoxy-forming material. The halohydrin obtained may then be dehydrohalogenated according to conventional procedure.

The higher molecular weight products produced by the above methods vary from viscous liquids to solids having relatively high melting points. They possess active epoxy groups as well as hydroxyl groups and may be cured or undergo further reaction through either of these functional groups.

The new polyepoxides of the invention and their higher molecular weight products as described above may be cured through the epoxy groups to form valuable polymeric products. They may be polymerized alone or with other polyepoxide materials in a variety of different proportions, such as, for example, with amounts of other polyepoxides varying from 1% to 95% by weight. Polyepoxides that may be copolymerized with these products of the present invention include, among others, glycidyl polyethers of polyhydric phenols obtained by reacting polyhydric phenols, such as bis-phenol-A, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin are often referred to as "ethoxyline" resins. See Chemical Week, vol. 69, page 27, for Sept. 8, 1951.

A more detailed description of polyepoxides and their preparation may be found in U.S. 2,633,458.

A great variety of different curing agents may be employed in effecting the above-described homo- and copolymerization. Such agents include, among others, carboxylic acids or anhydrides, such as oxalic acid, phthalic acid, phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl orthophosphate, hexaethyl tetraphosphate; amine compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate and magnesium perchlorate.

The amount of the curing agents employed may vary over a considerable range depending upon the agent selected. With curing agents having replaceable hydrogen, such as the amine curing agents, amounts of agent employed vary up to and including equivalent proportions, i.e., sufficient curing agent to furnish a replaceable hydrogen atom for every epoxy group to be reacted. In most cases, satisfactory cures are obtained with from .7 to 1 equivalent of the curing agent per equivalent of epoxy compound.

Other curing agents, such as metal salts, are employed in amounts varying from about 1% to about 20%, and more preferably from about 3% to 20%.

The cure of the polyepoxides is preferably effected by mixing the curing agent with the polyepoxide and then heating. The temperature selected will vary with the curing agent. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from about 60° C. to 150° C.

If the new polyepoxides or their higher molecular weight derivatives are to be used in the preparation of castings or pottings, the curing agent and the epoxy material are generally combined together and then poured into the mold or casting which may if desired contain additional material, such as electrical wires, apparatus, etc., and the mixture then heated to effect the cure.

The new polyepoxides and their higher molecular weight derivatives may also be employed with the aforedescribed curing agents to prepare improved surface coating compositions of the air-drying or baking type. In utilizing the products for this application, it is generally desirable to combine the epoxy material and the curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propoinate, ethyl cellulose, and the mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl group with compounds, such as methylol ureas, methylol phenols, diisocyanates, and the like.

The new polyepoxides and their higher molecular weight derivatives may also be employed with the curing agents to prepare valuable adhesive and impregnating compositions. The monomeric polyepoxides generally have sufficiently low viscosities so they may be used in these applications as such without the addition of diluents. The higher molecular weight products, on the other hand, are preferably utilized with diluents and solvents, such as benzene, toluene, acetonitrile, and the like. In these applications a spreadable fluid mixture containing the polyepoxide is formed and then the curing agent added and the mixture applied to the desired surface.

In addition to their use in forming the above-described polymeric products, the new polyepoxides and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other tsabilizing agents, such as urea and thiourea derivatives. In most cases, the products are effective as stabilizers in amounts varying from about .1% to 5% by weight of the polymer being stabilized. The epoxy material may be combined with the halogen-containing polymer by any suitable method, such as by dissolving the products in a suitable solvent or by milling the products together on a suitable roll mill.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

This example illustrates the preparation and some of the properties of ethylene glycol bis(2,3-epoxycyclohexanecarboxylate).

100 parts of 2-cyclohexenecarboxylic acid and 18.6 parts of ethylene glycol was added to 150 parts of toluene and 7.5 parts of an ion-exchange resin added. The mixture was refluxed at 116° C. for 5 hours. The toluene and excess acid was removed under pressure leaving the liquid ethylene glycol bis(2-cyclohexenecarboxylate).

41 parts of the ester prepared as shown above was dissolved in 60 parts of chloroform. A peracetic acid solution prepared by mixng 60 parts of acetic acid, 0.67 part of sulfuric acid and 25 parts of 90% hydrogen peroxide was added dropwise to the above solution over a period of 25 minutes. The mixture was maintained at 10° C. for several hours and then allowed to stand overnight at 0° C. The mixture was then washed with water, 2% sodium carbonate and then chloroform removed under reduced pressure. The resulting product was a high boiling water white liquid having an epoxy value of 0.397 eq./100 g.

6.21 parts of the ethylene glycol bis(2,3-epoxycyclohexanecarboxylate) prepared above was mixed with 3.79 parts of hexahydrophthalic anhydride and 0.1 part of benzyldimethylamine and the mixture heated at 100° C. for 2 hours and then 120° C. for 2 more hours. The resulting product had a Barcol hardness of 36.

*Example II*

This example illustrates the preparation and some of the properties of glycerol tri(2,3-epoxycyiohexanecarboxylate.

160 parts of glycerol tri(2-cyclohexenecarboxylate) was added to 150 parts of chloroform. 163 parts of a 45% peracetic acid solution was then added to the mixture and the resulting mixture maintained at 30° C. for about 2 hours. The mixture was then allowed to stand in a water bath at 27° C. for about 12 hours. The reaction mixture was extracted with water, sodium carbonate, water and then filtered and dried. Chloroform was then taken off and the mixture distilled to yield a liquid identified as glycerol tri(2-epoxycyclohexanecarboxylate).

100 parts of the triester prepared above was combined with 28 parts of meta-phenylene diamine and the mixture heated at 150° C. for 2 hours. The resulting product was a hard tough casting.

When the above triester was heated with hexahydrophthalic anhydride and benzyldimethylamine, a hard tough casting was also obtained.

*Example III*

This example illustrates the preparation and some of the properties of ethylene glycol bis(4-(2,3-epoxy-2-methylpropyl)benzoate).

145 parts of ethylene glycol bis(4-methallylbenzoate), prepared by reacting ethylene glycol with methallylbenzoic acid disclosed in U.S. 2,677,678 was added to 150 parts of chloroform. 163 parts of a 45% peracetic acid solution was then added to the mixture and the resulting mixture maintained at 30° C. for about 2 hours. The mixture was then allowed to stand in a water bath at 27° C. for about 12 hours. The reaction mixture was then extracted with water, sodium carbonate, water and then filtered and dried. Chloroform was taken off and the mixture distilled to yield a white liquid identified as ethylene glycol bis(4-(2,3-epoxy-2-methylpropyl)-benzoate).

10 parts of the above diester was mixed with 3 parts of meta-phenylene diamine and the mixture heated at 150° C. for several hours. The resulting product was a hard solid casting. A similar casting was obtained by heating the diester with dichloromaleic anhydride and benzyldimethylamine.

*Example IV*

This example illustrates the preparation and some of the properties of 1,5-pentanediol bis(2,3-epoxycyclohexanecarboxylate).

148 parts of 1,5-pentanediol bis(2-cyclohexenecarboxylate) was added to 150 parts of chloroform. 163 parts of a 45% peracetic acid solution was then added to the mixture and the resulting mixture maintained at 30° C. for about 2 hours. The mixture was then allowed to stand in a water bath at 25° C. for 12 hours. The reaction mixture was extracted with water, sodium carbonate, water and then filtered and dried. Chloroform was taken off and the mixture distilled to yield a liquid identified as 1,5-pentanediol bis(2,3-epoxycyclohexanecarboxylate).

10 parts of the diester prepared as above was mixed with 4 parts of hexahydrophthalic anhydride and 0.1 part of benzyldimethylamine and the mixture heated at 100° C. for 2 hours and then 120° C. for 2 more hours. The resulting product was a very hard tough casting.

1,5-pentanediol bis(2,3-epoxycyclohexanecarboxylate) was also found to be a good combined stabilizer-plasticizer for polyvinyl chloride.

Related products are obtained by replacing the 1,5-pentanediol (bis(2-cyclohexanecarboxylate) in the above process with equivalent amounts of each of the following: 1,4-butanediol bis(2-cyclohexenecarboxylate), 1,8-octanediol bis(2-cyclohexanecarboxylate) and 1,6-hexanediol bis(3-cyclohexenecarboxylate).

*Example V*

This example illustrates the preparation and properties of diethylene glycol bis(4-(2,3-epoxy-2-methylpropyl)benzoate).

163 parts of diethylene glycol bis(4-methallylbenzoate) was added to 150 parts of chloroform. 163 parts of a 45% peracetic acid solution was then added to the mixture and the resulting mixture maintained at 27° C. for about 2 hours. The mixture was then allowed to stand in a water bath at 27° C. for about 12 hours. The reaction mixture was then extracted with water, sodium carbonate, water and then filtered and dried. Chloroform was taken off and the mixture distilled to yield a liquid identified as diethylene glycol bis(4-(2,3-epoxy-2-methylpropyl)benzoate).

10 parts of the diester prepared as above was mixed with 4 parts of hexahydrophthalic anhydride and 0.1 part of benzyldimethylamine and the mixture heated at 100° C. for 2 hours and then 120° C. for 2 more hours. The resulting product was a very hard tough casting.

The above prepared diester was also found to be a good combined stablizer-plasticizer for polyvinyl chloride.

Related products are obtained by replacing the diethylene glycol bis(4-methallylbenzoate) in the above process with equivalent amounts of each of the following: 1,5-pentanediol bis(4-methallylbenzoate), 1,4-butanediol bis-(4-allylbenzoate) and 1,2,6-hexanetriol tri(4-methallyl-benzoate).

I claim as my invention:

1. Hard cured products comprising the product of the reaction of an ester of a vic-epoxy-substituted carbocyclic monocarboxylic acid and a polyhydric alcohol with a boron trifluoride complex.

2. Products according to claim 1 wherein the reaction to effect the cure is conducted at a temperature from about room temperature to about 150° C.

3. Products according to claim 1 wherein the ester is an epoxycyclohexane carboxylic acid ester of an alkane diol containing from 2 to 16 carbon atoms.

4. Products according to claim 1 wherein the ester is ethylene glycol bis(2,3-epoxycyclohexane carboxylate).

5. Products according to claim 1 wherein the ester is glycerol tri(2,3-epoxycyclohexane carboxylate).

6. A process for preparing hard, cured products comprising reacting a boron trifluoride complex with an ester of a vic-epoxy-substituted carbocyclic monocarboxylic acid and a polyhydric alcohol.

7. A process according to claim 6 wherein the reaction is effected at a temperature from about room temperature to about 150° C.

8. A curable composition comprising (a) an ester of the following formula:

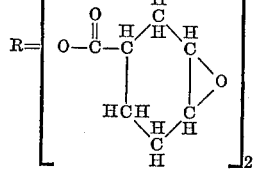

wherein R is a saturated divalent aliphatic radical, each of said valences being on separate carbon atoms, said R being composed of no atoms other than carbon, hydrogen and oxygen, wherein any oxygen present in R is present only as ethereal oxygen, the valence of R being completely satisfied by the carbonyl group of the acid moiety of said ester and (b) a boron trifluoride complex.

9. A curable composition comprising (a) an ester of the following formula:

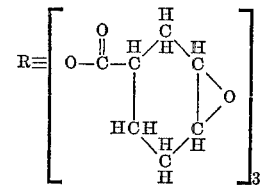

wherein R is a trivalent saturated aliphatic hydrocarbon radical having at least three carbon atoms, each of said valences being on separate carbon atoms and being completely satisfied by the carbonyloxy group of the acid moiety of said ester and (b) a boron trifluoride complex.

References Cited in the file of this patent
UNITED STATES PATENTS

| | | |
|---|---|---|
| 2,633,458 | Shokal | Mar. 31, 1953 |
| 2,712,535 | Fisch | July 5, 1955 |
| 2,716,123 | Frostick et al. | Aug. 23, 1955 |
| 2,745,847 | Phillips et al. | May 15, 1956 |
| 2,884,408 | Phillips et al. | Apr. 28, 1959 |